Patented Jan. 3, 1950

2,493,080

UNITED STATES PATENT OFFICE 2,493,080

FREE-FLOWING FOOD COMPOSITIONS

Sidney Musher, New York, N. Y., assignor to Musher Foundation Incorporated, New York, N. Y., a corporation of New York No Drawing. Application November 27, 1944,
Serial No. 565,409

9 Claims. (Cl. 99—153)

1

The present invention relates to free flowing food compositions and particularly to those food compositions which contain over about 5% fat and which normally have a tendency to form agglomerated particles or particles which stick together.

Many food materials have this tendency to "ball" and are difficult to add to aqueous compositions or to disperse with other powdery materials. It has been customary in the past to add certain foreign materials to these products to overcome this condition as, for example, by the addition of tricalcium phosphate, sugar or salt.

An object of the present invention is a new method to overcome the tendency on the part of food compositions and particularly finely divided foods which contain over about 5% fat to "ball" or stick or to form agglomerated particles, which object can be accomplished economically and easily.

A further object is to prepare a new food product without, however, adding foreign materials which would require label changes and at the same time to accomplish the objects herein set forth.

A further object is to develop better keeping qualities in the products which have been made in accordance with the present invention such as, for example, to retard oxidative deterioration of such products.

Still further objects and advantages will appear from the more detailed description set forth below, it being understood, however, that this more detailed description is given by way of illustration and explanation only, and not by way of limitation since various changes therein may be made by those skilled in the art without departing from the scope and spirit of the present invention.

The product treated in accordance with the present invention is one which contains at least about 5% total fat and which normally has a tendency to "ball" or to form agglomerated particles when in finely divided form whereby the treated product does not require special methods of dispersion when added to aqueous compositions or when mixed with other dry ingredients.

A typical example of this type of product is ordinary oat flour which is made by grinding oat groats. For example, when oat groats are ground so that all the particles will go through a 70 mesh

2 screen, the oat flour thus obtained cannot readily be sprinkled over potato chips because of the tendency of the particles to "ball" and to group together thereby forming large particles on the screen or sifter. Similarly when oat flour is added to an ice cream mix the oat flour is not readily dispersed in the mix and lumps of oat flour particles are present in the mix which subsequently become coated on the homogenizer screen as the ice cream mix containing the oat flour goes through the pipe lines into the homogenizer.

In accordance with the present invention, the oat flour or other product to be treated is saturated with a fat solvent such as, for example, with acetone, hexane, petroleum ether, or isopropyl alcohol until a heavy paste or free flowing paste is formed and until all the particles of the oat flour are contacted with and soaked in the solvent. For example, between 1 and 10 parts and preferably between 1 and 3 parts of solvent are combined with each 5 parts of the oat flour with agitation to form a paste or free flowing heavy dispersion of the oat flour in the fat solvent.

The fat solvent alone is then removed without, however, removing any of the constituents of the oat flour. This is accomplished by volatilization, vacuum or other drying, and is desirably accomplished by placing the oat flour in a revolving drum at atmospheric or subatmospheric pressures and applying sufficient heat, preferably not exceeding 160° F. and desirably at a temperature not in excess of 125° F. until all the fat solvent has been removed. Under these circumstances the fat solvent alone is removed from the oat flour or other product to be treated.

The oat flour thus obtained may be finely divided as by sifting or further grinding although sifting alone is all that is required in order to break up the particles of the oat flour following the treatment with the fat solvent.

As a result of this treatment the fat soluble constituents of the oat flour apparently have been realigned and possibly a chemical reaction has occurred between the various components of the oat flour or as a result of this treatment the oat flour is completely changed with respect to its behavior.

After removal of the fat solvent and preferably after screening or finely dividing, the oat flour is substantially freed of all tendency toward "balling" or lumping and may be added to hot aqueous solutions without "balling" or forming agglomerated particles and may readily be mixed with other dry materials. The product also has unusually better keeping qualities.

Although there has been no change in the total chemical values such as in the nitrogen, carbon, oxygen, etc., content of the oat flour, nevertheless as a result of treatment with this solvent, even though no fat has actually been removed the product is totally changed and reconstructed to produce a new and novel oat flour. This oat flour may then be mixed, for example, with other ingredients to form a doughnut mix or may be sprinkled on potato chips or nuts or added to hot water or ice cream mixes without "balling" or lumping and with a markedly reduced tendency toward coating on the homogenizer screens.

Among the other oat products that may similarly be treated is included the finely divided coarse fraction of dehulled oats produced, for example, in accordance with Patent No. 2,355,028.

Other cereal products which normally have a tendency to "ball" or to form agglomerated particles and which preferably have at least about 5% total fat content include rice bran and rice polish, corn germ and wheat germ. Even where these products have not been finely divided before treatment with the fat solvent as in the case of the treatment of wheat germ in accordance with the procedures of the present invention, the wheat germ that is obtained after treatment with the fat solvent and subsequent removal of the fat solvent without removing any of the normal constituents originally present in the wheat germ has a greatly improved keeping quality and markedly increased resistance to oxidative deterioration and rancidity.

It is not known exactly what occurs by the treatment herein described. The product, however, is changed in its physical characteristics and apparently also in its chemical characteristics since it reacts differently than the original product upon processing or upon standing. The fat or fat-like substances soluble in the fat solvent are apparently removed from the position in which they are in the naturally occurring product such as in the oat flour or wheat germ and are recombined and transposed with other materials normally present in those products to produce a different product as a result of this treatment.

Powdered egg yolk and powdered whole eggs are among the materials that may similarly be treated. Powdered eggs and powdered egg yolk besides being highly subject to oxidation deterioration present a particular problem insofar as their tendencies to "ball" and form large groups of agglomerated particles are concerned. By treatment with a fat solvent in the manner herein described a finely powdered material is obtained which remains powdery and does not have the tendency to "ball" and also has greatly improved keeping quality.

Other materials that may be treated include full fat soya flour or soya flour containing its normal complement of approximately 20% oil, granulated or powdered roasted coffee, as well as other cereal and seed flours.

These materials may where desired be subjected to treatment with the fat solvent before they have been finely divided or pulverized or ground as, for example, where wheat germ is treated with the fat solvent in accordance with the procedures herein outlined and then subjected to a grinding or finely dividing operation or where coffee beans are similarly treated before being pulverized or ground.

The procedure herein outlined is totally different from the procedure employed in normal solvent extraction or defatting operations. In those cases the fat is actually removed by treatment with the fat solvent. By the procedures of the present invention the fat or fat-like substances are not removed but are retained as part of the original processed material and the processed material contains the same fat content as the original product subjected to treatment.

It has also been observed that as a result of this process herein outlined the final product has less aromatic characteristics and appears to have undergone a deodorization process. For instance in the example of powdered egg yolk where the untreated material has the rather objectionable odor characteristic of that product, the treated material has a clean, sweet, fresh egg yolk odor and this odor is retained for a substantial period of time without change.

Among the other fat solvents that may be employed for the purposes of the present invention are included the volatile hydrocarbon solvents such as benzine, hexane, n-pentane, etc., as well as acetone which has been found to be highly satisfactory. There also may very desirably be used the low molecular weight aliphatic alcohols particularly isopropyl alcohol, including also methanol, ethanol or propanol. There may also be employed carbontetrachloride, carbondisulphide, dichlorethylene, trichlorethylene, dichlorethylether, cyclohexane, methylcyclohexane, etc.

The process of the present invention may similarly be utilized where it is desired to add a fat, oil, or fat soluble material such as a fat soluble vitamin such as vitamin A, carotene, vitamin D, 7 dehydrocholesterol, irradiated ergosterol, etc. For example, where between 6 and 15 pounds of fish oil or fish oil concentrate are added to a ton of grain with agitation, the final product is subject to rapid deterioration and particularly to loss of vitamin A content. However, where the fish oil concentrate is added to the grain in the presence of a fat solvent a more uniform dispersion of the vitamin A or fish oil over the entire body of the grain is obtained together with greatly improved stability and lessened deterioration and loss of the vitamin A content of the final product.

It is preferable to combine a small amount, as, for example, about 50 parts and preferably up to about 30 parts of the fish oil or fish liver oil, vitamin concentrate, fat or fat-like material with each 100 parts of the grain or cereal and with between 30 parts and 200 parts or preferably between 50 parts and 100 parts of the fat solvent. After this mixture is made and a composite material obtained the fat solvent is then removed and the product which has been freed of the fat solvent may be finely divided to obtain a powdery mass.

In connection with this material, where it is desirable to produce a vitamin concentrate for poultry food the fat would be present in the form of vitamin A, fish oil, fish liver oil, vitamin concentrate, or synthetic fat soluble vitamin preparation and the cereal or grain could be wheat bran, soya flour, oat flour, rye flour, barley flour, corn germ, etc. This vitamin concentrate could then be combined with the balance of the poultry food such as, for example, by admixing the dry product thus obtained with the other ingredients used to make up the poultry food or other animal food.

Where desired, a combination could be made with cocoa powder in the presence of the fat solvent and after removal of the solvent the cocoa powder containing the vitamin oils could then be admixed with sugar or similar material to make a cocoa or chocolate drink.

Where it is desired to combine, for example, glyceryl monostearate or other polyhydric alcohol ester with one OH group replaced by a fatty acid group, the polyhydric alcohol ester could be combined with the cereal or seed flour in the presence of a fat solvent followed by removal of the fat solvent in accordance with the procedures of the present invention in order to obtain a finely powdered material.

In a similar manner a pie crust mix or biscuit mix or doughnut mix could be produced in a finely divided or finely powdered form. Whereas at the present time these products are subject to caking, "balling," lumping, and have rather objectionable physical characteristics, by combining the fat with the flour in the presence of the fat solvent and then removing the fat solvent by volatilization, a completely uniform material capable of being finely powdered is obtained which has highly desirable physical characteristics and excellent keeping quality.

The products treated in accordance with the present invention such as oat flour, powdered eggs, wheat germ, etc., are all products which have not been subjected either to cold pressing or to expelling or to oil extraction. The procedures of the present invention are particularly applicable to those products which have their normal full oil or fat content without change and without removal of the fat or oil contained therein.

The procedures of the present invention are also applicable to desiccated food compositions and desirably to those which contain at least about 50% total fat. For example, dried cocoanut meats, cocoanut flour, cocoanut shreds, etc., may be treated with a fat solvent such as by adding sufficient fat solvent to saturate the cocoanut composition and followed by removal of the fat solvent by volatilization without substantially removing any of the normal constituents of the cocoanut composition. As a result of this treatment the cocoanut has greatly improved keeping qualities and has much greater economic value than the original untreated food composition.

In the treatment of many food products such as powdered eggs and dehydrated foods where stabilization of flavor and stabilization of the oxidizable vitamins such as vitamin A, carotene, etc., are desired, the procedures of the present invention may be used in order to retard decomposition and loss of these vitamin values.

Apart from the treatment of food products which contain at least about 5% fat such as the treatment of peanuts, soybeans, walnuts, cashew nuts and other nut meats, oat flour, etc., there are other food products which contain less than 5% fat but which may similarly but less preferably be treated such as, for example, toasted whole wheat products, toasted shredded wheat compositions, whole wheat flour, dog food which contains meat scraps and the fat of cereals. The meat scraps themselves may also be treated in a similar manner, desirably, however, in the presence of cereal compositions such as wheat flour, oat flour, soyabean flour, etc.

Furthermore, where an antioxygenic product such as oat flour is in dry form and where an oxidizable product such as powdered whole milk is also in dry form, although beneficial effects are obtained by either adding a minor amount of the oat flour to the liquid whole milk before drying or by drying mixing the oat flour with the powdered whole milk, an improved antioxygenic effect is obtained by the addition of the oat flour to the powdered whole milk in the presence of a fat solvent followed by removal of the fat solvent by volatilization. The addition of a fat solvent to a combination of a dry antioxidant and a dry oxidizable composition gives an enhanced antioxygenic effect and an effect which is even superior to the addition of the antioxidant to the oxidizable composition where the latter product is in aqueous form and before it has been dried.

This treatment is also of value in the preparation of dry powdery mixes such as doughnut mixes, biscuit mixes, etc., where the addition of a dry antioxidant does not give the same full effect that is given where the antioxident is added in the presence of the fat solvent followed by volatilization of the fat solvent.

Having described my invention, what I claim is:

1. A method of producing a food composition which comprises adding to and thoroughly admixing with a substantially dry food composition a fat solvent and then removing the fat solvent by volatilization.

2. A method of producing a food composition which comprises adding to and thoroughly admixing with a desiccated food composition a fat solvent and then removing the fat solvent by volatilization, said food composition containing at least 5% fat.

3. A method of producing a food composition which comprises saturating a substantially dry food composition with a fat solvent and then removing the fat solvent by volatilization.

4. A method of producing a non-caking, non-balling oat flour which comprises adding to the said oat flour and thoroughly admixing therewith a fat solvent and then removing the fat solvent by volatilization.

5. A method of producing an egg powder which comprises adding to the said egg powder and thoroughly admixing therewith a fat solvent and then removing the fat solvent by volatilization.

6. A method of producing a roasted coffee composition which comprises adding to the said coffee composition and thoroughly admixing therewith a fat solvent and then removing the fat solvent by volatilization.

7. A method of producing a non-caking, non-balling cereal flour which comprises saturating a cereal flour with a fat solvent until all of the particles of the cereal flour are contacted with and soaked in the solvent and then removing the fat solvent by volatilization.

8. A method of producing a non-caking, non-balling cereal flour which comprises saturating a substantially dry cereal flour with between 1 and 10 parts of a fat solvent to each 5 parts of the cereal flour, agitating the combination and then removing the fat solvent by volatilization.

9. A method of producing a free flowing food composition which has substantial non-caking, non-balling characteristics, which comprises saturating a substantially dry food composition with between 1 and 10 parts of a fat solvent to each 5 parts of the substantially dry food composition, agitating the combination and then removing the fat solvent by volatilization, said food composition having the same total constituents as before treatment with the fat solvent.

SIDNEY MUSHER.

REFERENCES CITED

The following references are of record in the file of this patent:

UNITED STATES PATENTS

| Number | Name | Date |
|---|---|---|
| 128,371 | Dotch et al. | June 25, 1872 |
| 343,163 | Dorsey | June 8, 1886 |
| 1,851,266 | Todd | Mar. 29, 1932 |
| 1,979,124 | Tival | Oct. 30, 1934 |
| 2,137,890 | Hopkins | Nov. 22, 1938 |
| 2,176,026 | Musher | Oct. 10, 1939 |
| 2,233,251 | Draghi | Feb. 25, 1941 |
| 2,324,471 | Allen et al. | July 20, 1943 |

FOREIGN PATENTS

| Number | Country | Date |
|---|---|---|
| 401,884 | Great Britain | Nov. 23, 1933 |